United States Patent

Chambers et al.

[15] 3,666,884

[45] May 30, 1972

[54] ELECTRONIC SIMULATION OF VARIABLE INCLINATION REFERENCE BEAM FOR ACOUSTICAL HOLOGRAPHY

[72] Inventors: Harold L. Chambers, Royal Oak; Emanuel Marom, Oak Park; Rolf K. Mueller, Brighton, all of Mich.

[73] Assignee: The Bendix Corporation

[22] Filed: Jan. 24, 1969

[21] Appl. No.: 793,777

[52] U.S. Cl. ................................178/6.8, 340/5 H, 350/3.5
[51] Int. Cl. ...........................................................H04n 7/18
[58] Field of Search ......................350/3.5; 340/5 H; 178/6.8

[56] References Cited

UNITED STATES PATENTS 3,467,216  9/1969  Massey....................................350/3.5

OTHER PUBLICATIONS

MacAnally– Inclined Reference Acoustic Holography– Applied Physics Letters– Vol. No. 8,– 15 Oct. 1967,– pp. 266– 268

Mueller, Marom, Fritzler– Electronic Simulation of a Variable Inclination Reference for Acoustic Holography via Ultrasonic Camera– Applied Physics Letters– Vol. 12, No. 11,– June 1968– pp. 394– 395

Deschamps– Some Remarks on Radio Frequency Holography– Proc. of the IEEE– Apr. 1967, Vol. 55, pp. 570, 571

Denisyok al.– al.— Possibility of Obtaining Holograms Using a Reference Beam Whose Wavelength Differs from the Wavelength of the Light Scattered by an Object– Soviet Physics– Doklady– Vol. 12, No. 10, Apr. 1968,– pp. 954, 955

*Primary Examiner*—Robert L. Griffin
*Assistant Examiner*—Joseph A. Orsino, Jr.
*Attorney*—William F. Thornton and Plante, Hartz, Smith & Thompson

[57] ABSTRACT

A method and apparatus for electronically simulating a plane wave reference beam of variable inclination for use in an acoustical holography system. The invention is based on the principle that the phase of a plane wave changes linearly over the plane of detection. In systems where the detection is obtained by scanning the aperture in the plane of detection, as in certain acoustical holography setups, the required reference beam simulating a plane wave can be generated by an electronic signal having a frequency slightly different from the one used to irradiate the object. The apparatus can be adjusted to obtain a simulated reference beam of any desired angle of incidence up to 90°.

9 Claims, 2 Drawing Figures

SOUND HOLOGRAPHY VESSEL

Patented May 30, 1972

INVENTORS
HAROLD L. CHAMBERS
EMANUEL MAROM
BY ROLF K. MUELLER

William F. Thornton
ATTORNEY

ELECTRONIC SIMULATION OF VARIABLE INCLINATION REFERENCE BEAM FOR ACOUSTICAL HOLOGRAPHY

BACKGROUND OF THE INVENTION.

This invention pertains generally to the field of ultrasonic holography and more specifically to the electronic simulation of the reference beam required to make an ultrasonic hologram. The idea of electronically simulating a reference beam in an acoustical holography system is not new. The electronically simulated reference beams for holographic displays have been used previously in mechanical scanning configurations by various authors including the following: K. Preston and J. L. Kreuzer, *Applied Physics Letters*, Vol. 10, Page 150 (1967); Georges A. Deschamps, *Proceedings of the IEEE*, Vol. 55, Page 570 (1967); G. A. Massey, *Proceedings of the IEEE*, Vol. 55, Page 1,115 (1967); A. F. Metherell and H.M.A. El-Sum, *Applied Physics Letters*, Vol. 11, Page 20 (1967); A. F. Metherell, H.M.A. El-Sum, J.J. Dreher, and L. Larmore, *Journal of the Acoustical Society of America*, Vol. 42, Page 733 (1967); R. V. MacAnally, *Applied Physics Letters*, Vol. 11, Page 266 (1967); and A. F. Metherell and H.M.A. El-Sum, *Journal of the Acoustical Society of America*, Vol. 42, Page 1169A (1967).

The methods of electronically simulating a reference beam for acoustical holography discussed in the above articles pertain to mechanical scanning configurations. Although a possibility of simulating a plane wave reference beam of variable inclination has been suggested in these articles, no method or apparatus for generating such a signal has been revealed. There is no known apparatus in the electronic art for generating such an electrical signal of continuously shifting phase.

SUMMARY OF THE INVENTION.

This invention is a method and apparatus for the electronic simulation of the reference beam required to make an acoustic hologram. The method for obtaining such an electronic signal is to generate a stable oscillatory signal having a frequency slightly different from that of the frequency of the object beam irradiating the object being holographed. Mixing the oscillatory signal with the object beam produces the hologram point by point electronically so that it can be displayed on a television monitor. The angle of inclination of the actual reference beam with respect to the normal to the detection plane can be varied. Reference beams of greater angles of incidence generate more fringes while those which are at smaller angles of incidence generate less fringes. This phenomena can be simulated electronically by having more or less phase variations per scan line on the television display which is done by having a larger or smaller difference between the frequencies of the oscillatory signal and object beam signal. To maintain the interference pattern (generated electronically) spatially fixed for each television frame, it is necessary to lock the phase of the reference and the object signals at the beginning of each sweep by starting the reference beam at zero phase difference from the object beam at the beginning of each frame. This is accomplished electronically by phase locking the off-frequency oscillator signal to the object beam signal by means of a phase lock gate during the fly back period at the end of each frame.

The invention has several advantages. First, the invention makes possible angles of incidence which are not limited to the critical angle of the large quartz crystal detector which is approximately 15°. The angle of incidence of the electronically generated reference can simulate the reference beam at angles up to 90°. The desired angle of incidence may be simply selected by adjusting the frequency of the oscillator to obtain the desired frequency difference and consequent number of phase reversals. Second, the invention eliminates the requirement for a second ultrasonic transducer in the tank to generate the object signal. Finally, it is possible to obtain a more accurate plane wave reference beam electronically because the electronic signal does not deviate from an ideal plane wave as much as the reference beam generated by a transducer.

Further objects, features and advantages of this invention will become apparent from a consideration of the following description, the appended claims, and the accompanying drawing in which:

FIG. 1 is a system diagram of an acoustical holographic system incorporating the electronic reference beam generating apparatus of this invention; and FIG. 2 is a detailed schematic diagram of the reference oscillator and phase lock gate elements in the generation of the electronic simulation of the acoustical holographic reference beam.

DESCRIPTION OF THE PREFERRED EMBODIMENT.

Figure 1:
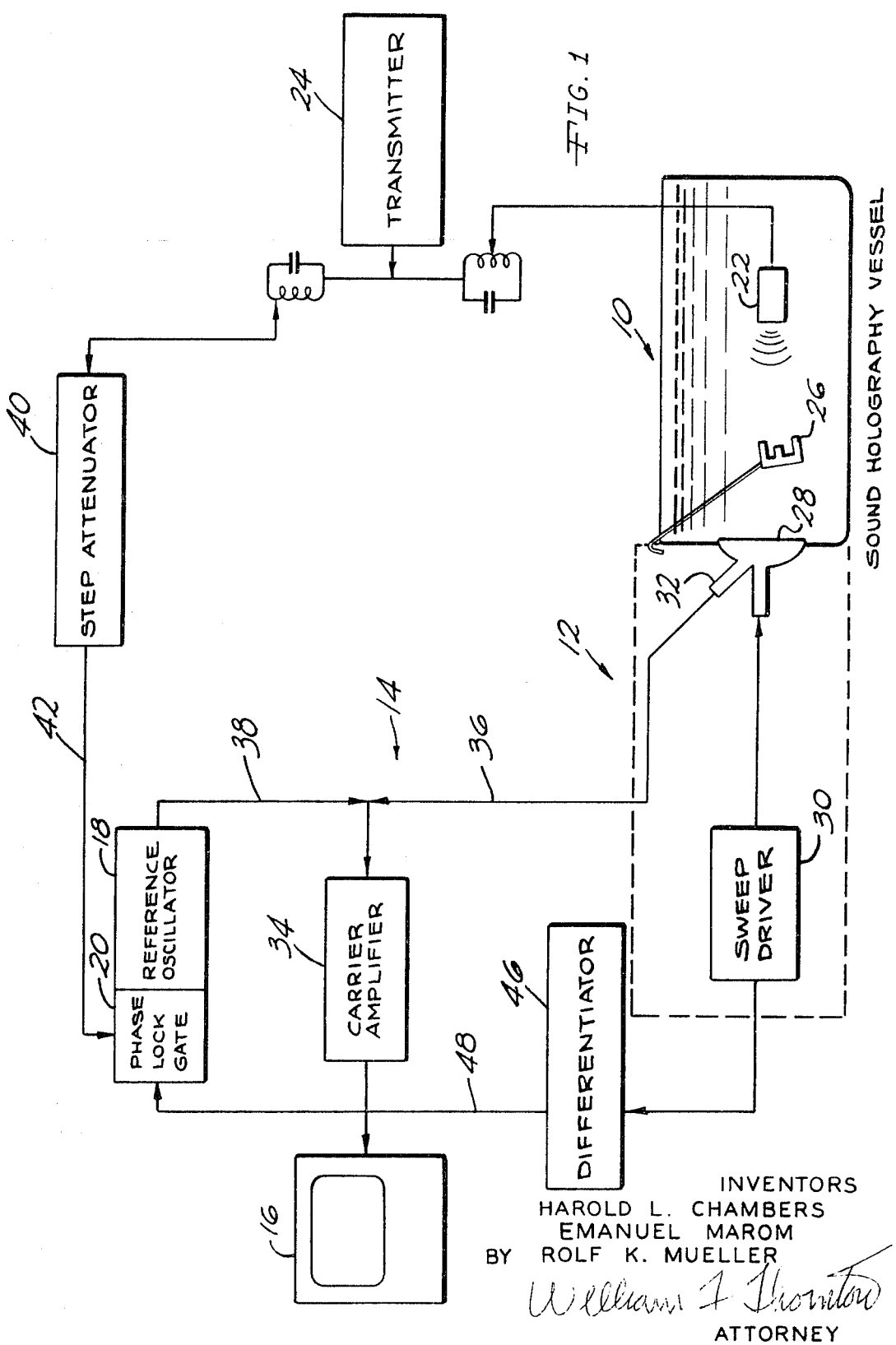
Figure 2:
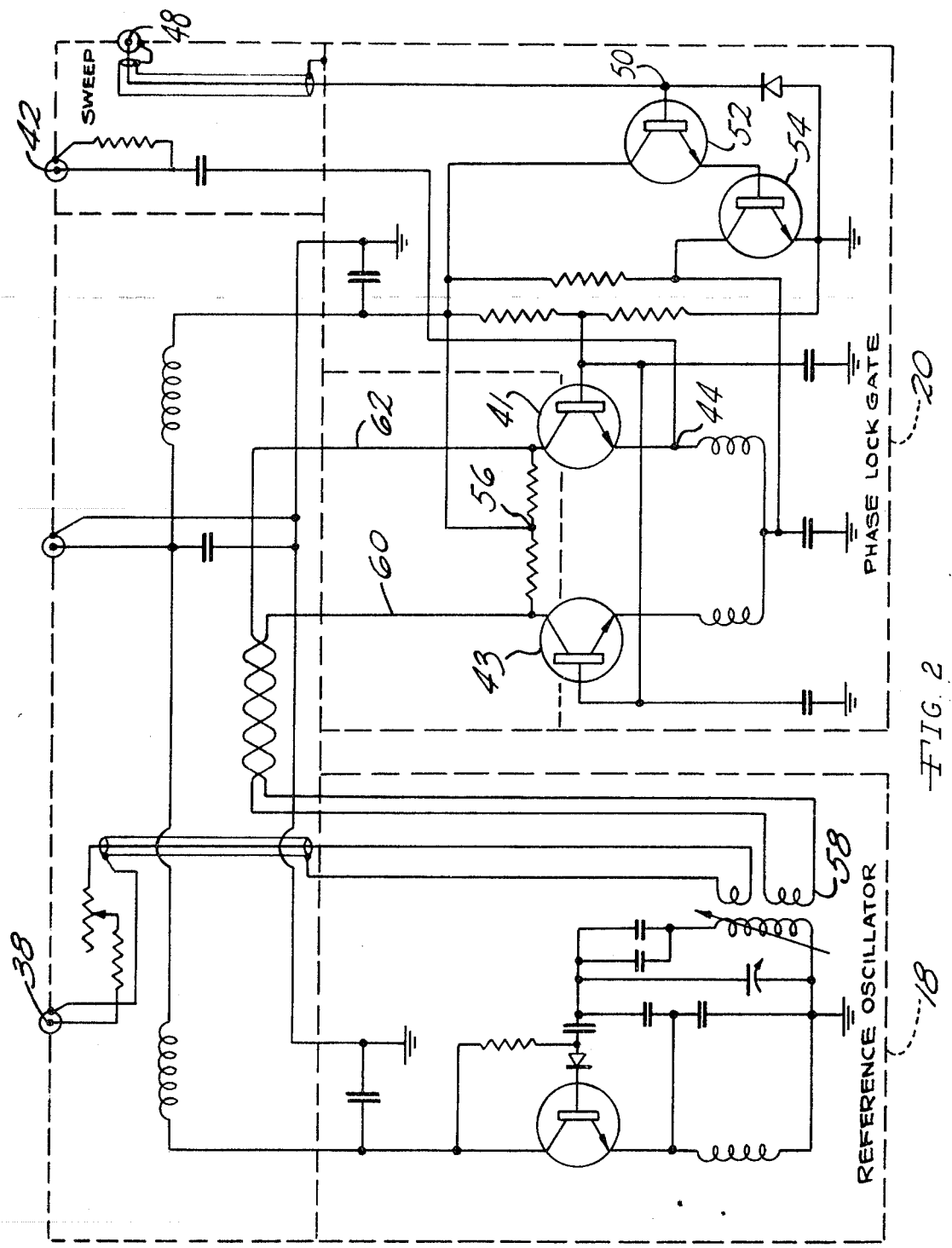

A complete system for producing an acoustic hologram and displaying it in real time on a television monitor using a reference beam which has been electronically generated is shown in FIG. 1 in block diagram form. The major parts of the acoustical holography system shown in FIG. 1 are the sound holography vessel indicated generally at 10 in which the acoustic hologram is made, a scanned electro-acoustic unit 12 which converts the acoustical hologram into an electronic signal and the artificial reference and display electronic indicated generally at 14 which provide an electronic reference beam and amplification to enable display of the ultrasonic hologram on television monitor 16. The key elements in the generation of the electronically simulated reference beam are the reference oscillator 18 and the phase lock gate 20, the detailed circuits of which are shown in FIG. 2.

The object beam required to made the acoustical hologram is obtained by driving an ultrasonic transducer 22 with a 7.0 MegaHertz electronic transmitter 24. The object beam from transducer 22 irradiates the test object 26 in the water-filled sound holography vessel indicated generally at 10. When the object beam from transducer 22 is scattered from the object 26 (the letter E cut from a thin metal plate), it is detected by quartz transducer 28.

The quartz transducer 28 is horizontally scanned like a television screen by a horizontal sawtooth sweep generated by sweep driver 30. The signal from sweep driver 30 produces a secondary emission on the inside face of quartz transducer 28. The amplitude of the secondary emission is related to the voltage pattern placed on the face of quartz transducer 28 by the scattered object beam.

Because of the nature of the quartz transducer 28, the object beam from transducer 22 scattered from object 26 impinging on quartz detector 28 sets up a voltage pattern which is directly proportional to the amplitude of the acoustic waves impinging on the face of quartz detector 28. It is this voltage distribution which modulates the secondary emission generated by the horizontal sweep signal from sweep driver 30. This modulated secondary emission, called the detected object beam, is amplified by an electron multiplier in the portion 32 of quartz detector 28. The detected object beam, after amplification by electron multiplier 32, is sent to carrier amplifier 34 by means of conductor 36.

If, instead of an electronically generated reference beam, a second ultrasonic transducer identical to transducer 22 were placed in the tank at the appropriate angle and driven by transmitter 24, the voltage pattern at the face of quartz detector 28 would be an interference pattern of acoustic waves corresponding to an acoustic hologram of the object 26. Hence, the detected signal present in conductor 36 would be an exact electronic analog of an acoustical hologram of object 26.

Since a reference beam transducer was not used, however, the electronic signal in conductor 36 is only the detected object beam and is not yet the electronic analog of an acoustical hologram of object 26. To obtain the electronic analog of an acoustical hologram of object 26, a plane wave reference beam must be electronically generated and added to the detected object beam now present in conductor 36. This invention provides a method and apparatus for generating and adding an electronically simulated plane wave reference beam to the detected object beam in conductor 36 to produce the electronic analog of an acoustical hologram of object 26.

In order to simulate an acoustic reference electronically, it is necessary that the phase of the electronic signal correspond at any instant to the phase that an actual acoustic reference beam would have at the point of the crystal detector being scanned at that instant. The phase $\phi$ of an acoustic plane wave incident at an angle $\theta_x$ with respect to the normal crystal detector plane varies according to the relationship:

$$\phi = (w_s t) + \left(\frac{2\pi}{\lambda_s} \times \sin \theta_x\right) + \phi_o \qquad (1)$$

where $\phi_o$ is a constant starting phase (which is made equal to 0 in the apparatus of the present invention as described below), $w_s$ and $\lambda_s$ are the acoustic frequency and wavelength, respectively, $t$ is time, and $x$ is the vertical coordinate of the crystal detector.

Since the electron beam from sweep driver 30 scans the crystal with the speed $v_x$ in the vertical direction (that is, $v_x$ is the speed with which the sweep driver changes from one horizontal raster to the next in a vertical direction), equation (1) can be rewritten as:

$$\phi = \left(\frac{2\pi}{\lambda_s} v_x \sin \theta_x + w_s\right) t + \theta_o = (w_s + \Delta w) t + \phi_o \qquad (2)$$

From equation (2), it can be seen that the relationship for the phase of an acoustic plane wave has the dimensions of frequency. It is possible therefore to simulate electronically the effect of the acoustic plane wave incident at an angle $\theta_x$ by adding to the input of carrier amplifier 34 a signal that is shifted in frequency by an amount $\Delta w$ from the acoustic frequency $w_s$ being used. By varying $\Delta w$, one can obtain any desired phase angle and hence can simulate any desired angle of incidence $\theta_x$ for the plane wave reference beam.

In the circuitry for producing the frequency $\Delta w$ a stable off-frequency reference oscillator 18 having a frequency of 7.01 MegaHertz is used. Since the 7.01 MegaHertz frequency of reference oscillator 18 is slightly different from the 7.0 MegaHertz frequency of transmitter 24, the mixing of these two signals provides a beat frequency which is displayed on the television monitor as a set of fringes.

In FIG. 1, the mixing is done as follows. The detected object beam in conductor 36 has the same 7.0 MegaHertz frequency as transmitter 24. However, the detected object beam also has the phase information from the scattering of the object beam from object 26 which is so important in holography. Hence, this phase information will be included in all the sum and difference frequencies which result from the mixing.

The signal from reference oscillator 18 and present in conductor 38, however, is at a frequency of 7.01 MegaHertz. The signals from conductors 36 and 38 are mixed in the nonlinear carrier amplifier 34. In this manner, the plane wave reference beam simulated by a signal of frequency $w + \Delta w$ and the detected object beam scattered from object 26 and carrying the important phase information are combined to form the electronic equavalent of the acoustical hologram of the object 26, which is displayed directly on television monitor 16. In this way, a real time display of the acoustical hologram of object 26 is presented on television monitor 16.

To maintain the interference pattern spatially fixed in the same relative position for each television frame, it is necessary to lock the phase between the reference and object signals at the beginning of each sweep. This causes the linearly changing phase of the reference oscillator 18 (which is producing reference beam simulating phase reversals at desired intervals along the horizontal rasters of the television scan) to produce the same phase at the same point on the television frame because the phase change rate is constant and because the starting point is fixed at the beginning of each television frame. This is accomplished by making $\theta_o = 0$ at the beginning of each sweep. This is done electronically by forcing the loosely coupled reference oscillator 18 to lock phase with and oscillate at the transmission frequency of 7.0 MegaHertz rather than 7.01 MegaHertz during the retrace period so that the signal and the reference beam have the same phase at the start of each television frame.

The method for locking phase in the apparatus of the preferred embodiment of the present invention is by means of phase lock gate 20. There are two inputs to phase lock gate 20. First is the 7.0 MegaHertz signal from transmitter 24. After being attenuated by step attenuator 40, the 7.0 MegaHertz signal is passed by conductor 42 into the differential transistor amplifiers 41 and 43 of phase lock gate 20 at junction 44. The other input to phase lock gate 20 comes from the differentiation of the end-of-frame signal from sweep driver 30; this signal provided by differentiator 46 along conductor 48 into the base of the first of the two transistors 52 and 54 of phase lock gate 20 at junction 50. The positive voltage pulse provided by differentiator 46 along conductor 48 to the base of gating transistor 52 turns on transistor 52 which in turn turns on transistor 54 thereby turning on the differential amplifiers 41 and 43. This permits the 7 MegaHertz signal to pass to transformer coil 58 in the reference oscillator 18 via conductors 60 and 62. In this manner, the 7.0 MegaHertz transmitter signal is gated to the tank circuit of reference oscillator 18 where it forces that 7.01 MegaHertz oscillator to oscillate at 7.0 MegaHertz at the beginning of each frame.

Since reference oscillator 18 is loosely coupled, the amplified 7 MegaHertz signal present at coil 58 during the fly back period at the end of each frame, forces reference oscillator 18 (which normally oscillates at 7.01 3 to oscillate at 7.0 MegaHertz during the fly back period and, hence, at the beginning of each frame. This lock-in feature eliminates the phase difference between the detected object beam in conductor 36 and the 7.01 MegaHertz signal normally found in conductor 38. By starting the signals exactly in phase, that is at $\theta_o = 0$, the phase of the reference beam at any point on any horizontal raster will be exactly the same for each television frame once the reference beam's angle of incidence has been selected by choosing the difference between the frequency of reference oscillator 18 and that of transmitter 24.

In summary, the apparatus of this invention electronically simulates a plane wave reference beam for use in scanned acoustical holography detection schemes by producing a signal which is of slightly different frequency from the signal irradiating the object.

In one test, the test object whose hologram was presented on television monitor 16 in real time, was a letter E which measured 1½ × 1 centimeters and was cut from a metal plate 3 millimeters thick. The maximum resolution of the test system at the 7 MegaHertz frequency was about 1 millimeter as determined by the Rayleigh criterion. This is the theoretical resolution for a 20° total cone angle of received sound since ultrasonic waves in the object beam having an incidence angle greater than the critical angle of about 18° for quartz detector 28 are totally reflected and not detected.

As can be seen from the above description, the addition of an electronic reference beam offers many advantages. Although the angle of incidence of an actual acoustic reference is limited by the critical angle of quartz to less than 18°, the angle of the reference beam is not limited for the electronic reference. Even a 90° angle of incidence is possible. In the test system, the number of scanning lines, 700, was so much greater than the maximum number of fringes that could be displayed generated even at a 90° angle of incidence and displayed on the 2-inch diameter crystal 28 that acoustical holograms having a reference beam angle of 90° could be synthesized, resolved and displayed by the system.

Moreover, it was possible to synthesize an ideal plane wave electronically, whereas an acoustic reference generated by a transmitter can deviate from an ideal plane wave and result in a distorted reconstructed image since the light reconstruction waves are planar or spherical.

Finally, the electronic reference beam of this invention is easily adjusted to simulate a plane wave reference beam of any desired incidence angle and eliminates the need for a second transducer in the tank.

It will be understood that the electronic simulation of variable inclination reference beam for acoustical holography which is herein disclosed and described in presented for purposes of explanation and illustration and is not intended to indicate limits of the invention, the scope of which is defined by the following claims.

We claim:

1. In a holographic system wherein a beam of coherent radiation irradiates an object and is modulated by said object and wherein the modulated signal from said object is detected in a detection plane, apparatus for electronically simulating a reference beam which is a plane wave of variable inclination with respect to said detection plane and capable of mixing with said modulated radiation comprising means for generating a stable oscillatory signal of adjustable frequency whose frequency is adjusted to be slightly different from the frequency of the detected signal, and means for mixing said oscillatory signal and the signal which has been modulated by said object and detected to obtain a new signal which is a hologram of said object.

2. The apparatus according to claim 1 further including means for modulating television display means with said new signal to obtain a real time television display of said hologram of said object.

3. In a holographic system wherein a beam of coherent radiation irradiates an object and is modulated by said object and wherein the modulated signal from said object is detected by an ultrasonic camera having a sensor in a detection plane, apparatus for electronically simulating a reference beam which is a plane wave of variable inclination with respect to said detection plane and capable of mixing with said modulated radiation comprising means for generating a stable oscillatory signal of adjustable frequency whose frequency is adjusted to be slightly different from the frequency of the detected signal, and means for mixing said oscillatory signal with the signal which has been modulated by said object and detected to obtain a new signal which is a hologram of said object.

4. The apparatus according to claim 3 further including means for modulating television display means with said new signal to obtain a real time television display of said hologram of said object.

5. In a holographic system wherein a beam of coherent radiation irradiates an object and is modulated by said object and wherein the modulated signal from said object is detected by a scanning sensor in a detection plane, the method of electronically simulating a reference beam which is a plane wave of variable inclination with respect to said detection plane and capable of mixing with said modulated radiation comprising the steps of:
   a. generating a stable oscillatory signal of adjustable frequency whose frequency is adjusted to be slightly different from the frequency of said modulated beam; and
   b. mixing said oscillatory signal with the signal which has been modulated by said object and detected to obtain a new signal which is a hologram of said object.

6. In an acoustical holographic system wherein an ultrasonic beam irradiates an object and is scattered by said object and wherein the signal scattered from said object is detected by an ultrasonic camera having a sensor in the detection plane, the method of electronically simulating a reference beam which is an ultrasonic plane wave of variable inclination with respect to said detection plane comprising the steps of:
   a. generating a stable oscillatory signal of adjustable frequency whose frequency is adjusted to be slightly different from the frequency of said detected signal; and
   b. mixing said oscillatory signal with the signal which has been scattered from said object and detected to obtain a new signal which is an acoustic hologram of said object.

7. In an acoustical holographic system wherein an ultrasonic beam irradiates an object and is scattered by said object and wherein the beam scattered from said object is detected in a detection plane, apparatus for electronically simulating a reference beam representative of an ultrasonic plane wave comprising means for generating a signal not of the frequency of said scattered beam, and means for mixing said generated signal and a signal representative of said scattered beam detected at said detection plane to obtain a new signal which is representative of an acoustic hologram of said object.

8. The holographic system set forth in claim 7 in which said system includes a television display means having scanning means for producing an image on a surface, and also having means for establishing substantially the same fixed phase relationship between said stable oscillatory and said modulated signal at the start of each traversal of said display scanning means across said surface.

9. The method set forth in claim 5 in which said step of generating a stable oscillatory signal is performed to provide a signal having the same fixed phase relationship to said irradiating beam at the start of each traversal of the detection plane by the scanning sensor.

* * * * *